INVENTOR
Hugo Reichert

BY Spencer & Kaye
ATTORNEYS

INVENTOR
Hugo Reichert
BY Spencer & Kaye
ATTORNEYS

CONVERTING DEVICE

Filed Oct. 17, 1962 7 Sheets-Sheet 3

INVENTOR
Hugo Reichert

BY Spencer & Kaye

ATTORNEYS

July 19, 1966 H. REICHERT 3,261,913

CONVERTING DEVICE

Filed Oct. 17, 1962 7 Sheets-Sheet 4

INVENTOR
Hugo Reichert

BY Spencer & Kaye

ATTORNEYS

July 19, 1966 H. REICHERT 3,261,913

CONVERTING DEVICE

Filed Oct. 17, 1962 7 Sheets-Sheet 5

INVENTOR
Hugo Reichert

BY Spencer & Kaye

ATTORNEYS

July 19, 1966 H. REICHERT 3,261,913

CONVERTING DEVICE

Filed Oct. 17, 1962 7 Sheets-Sheet 6

INVENTOR
Hugo Reichert

BY Spencer & Kaye

ATTORNEYS

INVENTOR
Hugo Reichert
BY Spencer & Kaye
ATTORNEYS 3,261,913
Patented July 19, 1966

1

3,261,913
CONVERTING DEVICE

Hugo Reichert, Wilhelmshaven, Germany, assignor to Olympia-Werke A.G., Wilhelmshaven, Germany Filed Oct. 17, 1962, Ser. No. 231,256
Claims priority, application Germany, Oct. 18, 1961, O 8,309
18 Claims. (Cl. 178—26)

The present invention relates generally to a long distance or long range transmission device, and, more particularly, to such a device for use with digital signals and having a clock pulse generator and a switching chain for interrogating coded signals.

In the field of digital information communication, there is often the necessity for transmitting coded signals over great distances. In such an event the communication traffic may be unidirectional, for example, from a substation to a central or main station, or bidirectional i.e., in both directions. In the former case, separate communication transmitters and communication receivers are required, whereas in the latter instance, it is possible to economically combine transmitter and receiver into a single unit.

If the transmissions are to take place over long distances, for purposes of economy, it is necessary to attempt to provide transmission over a single channel. Since the results of electronic computers are usually provided in coded form and also in parallel, it is necessary that there be a conversion of the information into series coded form before the transmission of these signals.

Over a period of time, many parallel to series or series to parallel converters have become known, and in one known embodiment the data which appears in parallel form is simultaneously stored in the stages of a shift register. Upon the appearance of a predetermined command, the shift register initiates releasing the stored values from stage to stage and a series pulse sequence appears at the output of the shift register.

A basically different type of parallel-series conversion is provided when individual storage elements are used wherein the information is stored in parallel form, and these elements are interrogated with pulses which are shifted in time with respect to each other. These interrogation pulses can be provided by using a delay line, or a ring counter, but also may be provided by a switching chain. Devices are also known wherein conversion is provided from parallel form into series form and the apparatus includes mechanical switches.

An embodiment which has recently become known includes a parallel-series converter for telegraph signals which uses a shift register to transform the signals for telegraph symbols into continuous sequences. In the operation of such an embodiment, at the beginning of the conversion process for a symbol signal, the first stage of the converter is in an operating condition which is different from the other stages. Such condition is shifted step by step under the control of a clock pulse, and the occurrence of this operating condition in the stages of the shift register indicates the polarity of the corresponding step of the signal which is to be converted, this signal being interrogated and transmitted.

It has previously been customary to use transmitting and receiving devices which differed structurally from one another, and, because of this, the expenditure and

2 complexity of the transmission of information was considerably increased over what would otherwise be necessary. It was frequently necessary to provide unidirectional signal traffic because it was impossible, for one reason or other, to obtain and operate a combined receiver and a transmitter.

With these defects of the prior art in mind, it is a main object of the present invention to provide an arrangement for long distance transmission of digital signals and which includes a converter for such signals.

Another object of the invention is to provide parallel-series and series-parallel converters, long distance transmission devices, and the devices which permit shifting as mentioned above, utilizing a minimum of circuit elements.

A further object of the present invention is to provide an arrangement which may be used as a parallel-series converter or transmitter, and also as a series-parallel converter or receiver.

These objects and others ancillary thereto are accomplished according to preferred embodiments of the invention wherein several circuit devices basic to both types of converters are connected together so that certain connections between these devices can be changed. In this manner, using the same basic circuit devices, the arrangement may be selectively used as a parallel-series or series-parallel converter.

A switching chain is provided which is sequentially actuated and associated with AND-circuits for providing signals to the AND-circuits in the sequence of the chain. Also, a storage register is provided which stores in parallel form, binary signals representative of a decimal number. The storage register is associated with the AND-circuits, and the particular connection therebetween depends upon whether the device is arranged as a series-parallel converter or a parallel-series converter.

A clock pulse generator is also provided which supplies pulses to operate the switching chain, and the arrangement can be varied with respect to its connections depending upon the function of the device at the particular time being considered. For example, when the device is to be a parallel-series converter the outputs of the storage register are connected to respective inputs of the AND-circuit and as the sequence proceeds through the switching chain, each AND-circuit is interrogated in synchronism with the clock pulses. This indicates, at the respective AND-circuits, the condition of the stages of the storage register, and this is sequentially provided to an OR-circuit. Thus, the OR-circuit provides a signal in binary coded series form.

On the other hand, when the device is to operate as a series-parallel converter the signals in binary coded series form are introduced to all first respective inputs of the set of AND-circuits simultaneously. As the sequence proceeds through the switching chain, an AND-circuit allows a signal to pass therethrough when a signal appears in series form at the input, and when a corresponding signal is received from the associated member of the switching chain, whereby the AND-circuit may have an output which sets a condition of a stage of the storage register. In this manner, the series signal is sequentially converted to a parallel signal which then appears at the storage register.

Thus it may be seen that with a relatively small amount of circuitry and with a suitable switching arrangement, a device is provided which may be selectively used as a series-parallel converter or a parallel-series converter and wherein almost all of the members thereof are used for both types of converting.

Additional objects and advantages of the present invention will become apparent upon consideration of the following description when taken in conjunction with the accompanying drawings in which.

Figure 7:
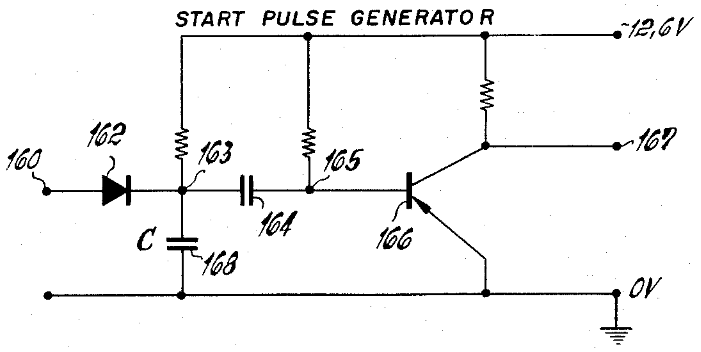
FIGURE 7 is a circuit diagram of the start pulse generator and includes the timing and shapes of wave forms in certain portions of the circuit.
Figure 7A:
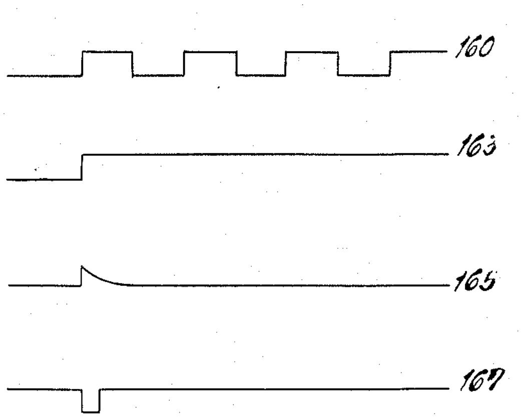

FIGURE 7*a* is a diagram indicating the timing of pulses at various points in the circuit of FIGURE 7.

Figure 1:
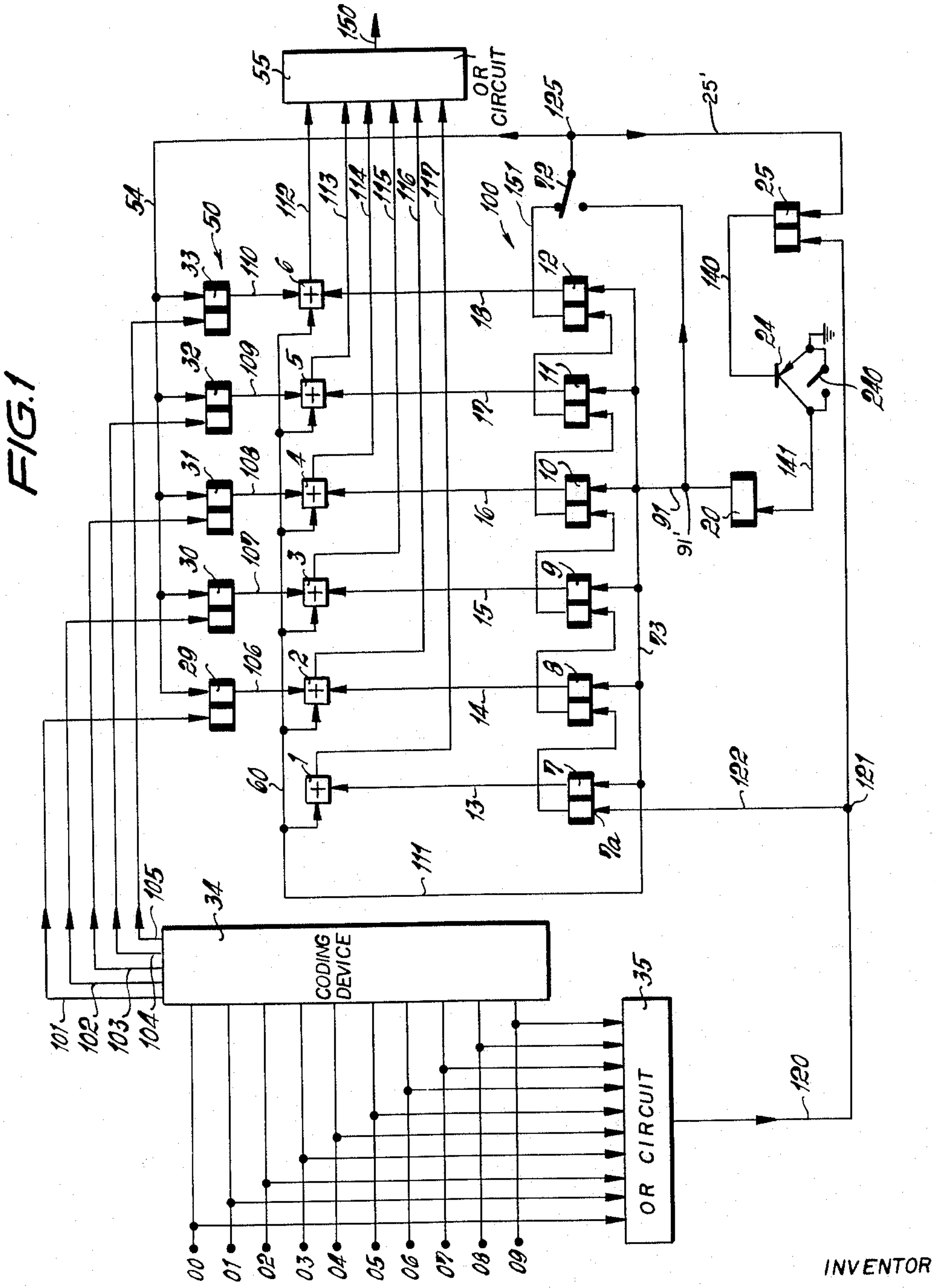
FIGURE 1 is a circuit diagram of the parallel-series section of the present invention.
Figure 3:
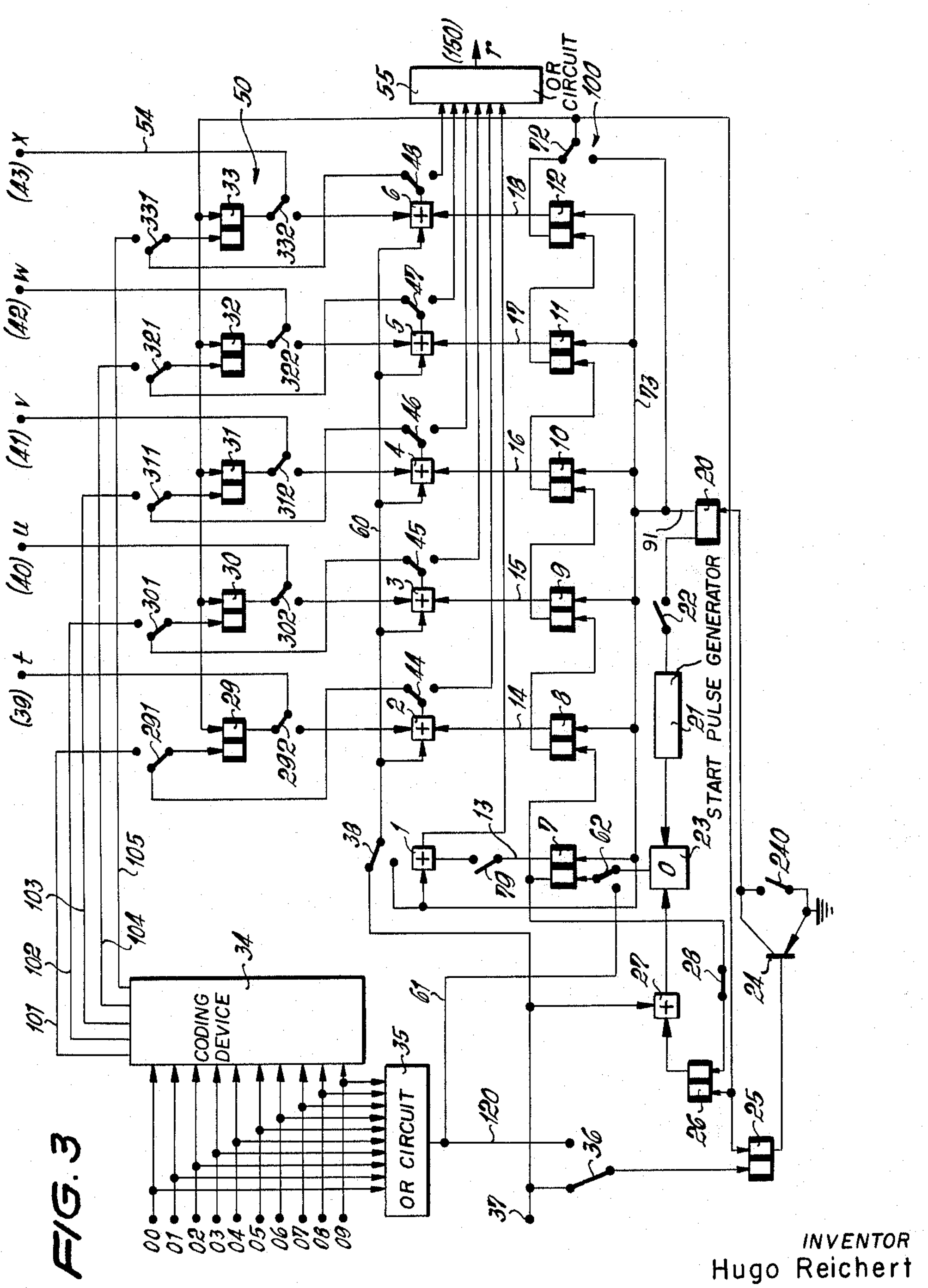
FIGURE 3 is a circuit diagram of the two converter sections combined together.

With more particular reference to the drawings, FIGURE 1 illustrates only the transmitting section of the long distance transmitting or parallel-series converting device for purposes of clarity so that the transmitting and receiving devices can be considered separately, although they are constructed in a unitary assembly as indicated in FIGURE 3. In order to further simplify the description of the invention, it will be assumed that only digits 0 through 9 are to be transmitted, and the inputs for these digits are designated 00 through 09. The digits may be fed from a typewriter, for example, or from a calculating device into the transmission device.

The digits then arrive at a coding device 34 which is connected to the calculating device and which converts the decimal digits from the calculating device into a five digit binary code. The output of the coding device is connected to a storage register 50 by means of lines 101 through 105. The storage register 50 has flip-flops 29 through 33 which are connected with the lines 101 through 105, respectively, so that the flip-flops are then placed into the condition corresponding to the code. A set of AND-circuits 2 through 6 are provided for the respective outputs of the stages 29 through 33 of storage register 50, and they are connected to each other by means of lines 106 through 110. These lines 106 through 110 thus provide first inputs for the AND-circuits. The other inputs thereof will be discussed below. The flip-flops 29 through 33 have, as mentioned above, their first respective inputs connected with lines 101 through 105 respectively, and their second inputs are connected to a common line 54 which is used to reset the register as described below.

The second inputs of the AND-circuits are connected to the stages 8 through 12 of a switching chain 100 by means of lines 14 through 18, it being noted that the switching chain 100 includes flip-flops 7 through 12 in its complete form with the first flip-flop 7 being connected by means of line 13 with a first AND-circuit 1.

Third respective inputs are provided for AND-circuits 1 through 6 and are connected to a common input line 60 which is connected with a common input line 73 for the flip-flops 7 through 12 of switching chain 100. Common lines 60 and 73 are connected together by means of a connecting line 111. A clock pulse generator 20 is provided and line 73 is connected, via line 91, with the output thereof so that the signal pulse generator or clock pulse generator 20 provides stages 7 through 12 with a clock frequency and the AND-circuits 1 through 6 are also provided with this clock frequency.

A first OR-circuit 55 is provided having an output 150 and input lines 112 through 117 which connect the outputs of the AND-circuits 1 through 6, respectively, with OR-circuit 55 and the OR-circuit thus represents a series signal output.

A second OR-circuit 35 is provided to which the input lines of coding device 34 are connected by means of separate lines so that the OR-circuit 35 connects all of the inputs to a common line 120 and from this line at point 121 a line 122 is connected to the input 7*a* of the first stage 7 of the switching chain 100. Also, a switch flip-flop 25 is provided, and one of the inputs thereof is directly connected with line 120 so that the switch flip-flop 25 may actuate the clock pulse generator 20 by means of the transistor 24 in a manner which will be described below. The transistor 24 can be bridged by a switch 240 and the function of this is also described below. Thus, the clock pulse generator 20 may feed the necessary shift pulses to the switching chain 100 and at the same time supply pulses in clock rhythm to the AND-circuits 1 through 6.

A switch 72 is provided and which is connected to the last flip-flop 12 of switching chain 100. This switch is connected to the line 54 at point 125. This line 54 is connected to the flip-flops of storage register 50 and is so connected that it can reset the flip-flops of the storage register. Another line 25′ is connected at point 125 and connects the switch 72 and the line 54 with a second input of the switch flip-flop 25. During the clearing or resetting process, switch 240 is closed to bridge the transistor 24, and, at the same time, the switch 72 connects the resetting line 54 of storage register 50 and the erasing line 25′ of the switch flip-flop 25 to the output point 91′ of the pulse generator 20. In its normal or rest condition switch 72 is connected with the output 151 of the switching chain 100. The operation of this circuit will be explained in detail below.

Figure 2:
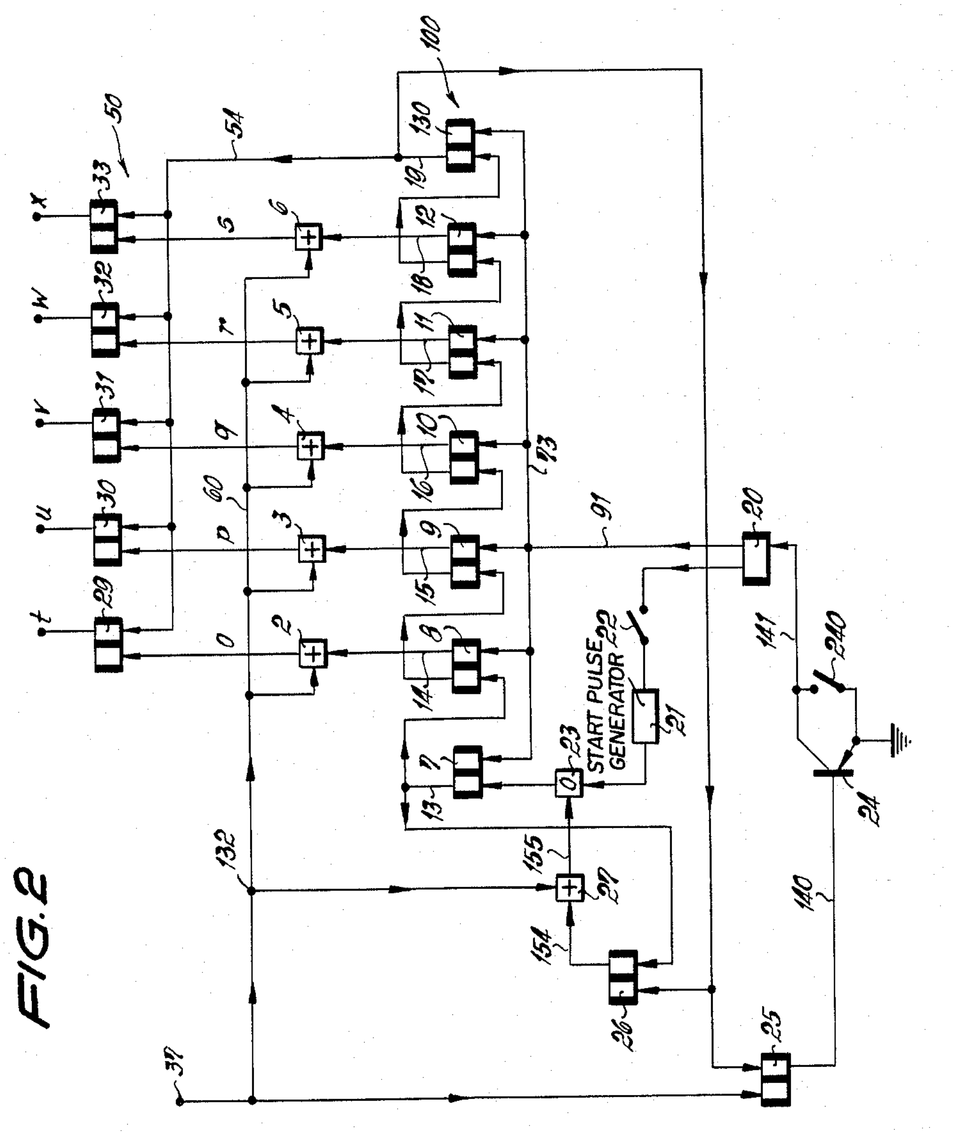
FIGURE 2 is a circuit diagram of the series-parallel section of the present invention.

With more particular reference now to FIGURE 2, the receiving section of the present invention is illustrated by itself for purposes of simplicity. An inspection of this figure of the drawing indicates that essential elements of the transmitting device are also used in this receiving device.

This receiver is advantageous in that it possesses the same simple construction as does the transmitting device illustrated in FIGURE 1. The information signals arrive at point 37 and represent binary digits. From this point a line leads to a common AND-circuit input line 60 by means of a connection point 132. The common line 60 leads to and provides first respective inputs for AND-circuits 2 through 6, and the second respective inputs of each of the AND-circuits is, as in the transmitting section, connected with a flip-flop stage of the switching chain 100. The AND-circuits 2 through 6 in this section each has only two inputs, and the outputs of the AND-circuits 2 through 6 are connected to flip-flops 29 through 33 forming the elements or stages of the storage register 50.

As with the transmitter, flip-flop 25 is used to control the clock pulse generator 20. The transistor 24 is connected between the controlling flip-flop 25 and the clock pulse generator 20 in a similar manner as in the transmitting circuit, and in this section also the transistor may be bridged by a switch 240. An output from the signal pulse generator 20 is connected to a line 91 which is in turn connected to a line 73 which is common to all of the flip-flops 7 through 12 and 130 of the switching chain 100.

An electronic switch is provided between the information input and the input to stage or flip-flop 7 of the switching chain 100, and this electronic switch connects the information input with the input of stage 7 for a short period of time. This electronic switch includes a flip-flop 26 and the AND-circuit 27 which has two inputs, one connected with a line which is connected to point 132 and thus with the information input 37, and another which is connected with a line 154 which is an output from flip-flop 26. The output 155 of the AND-circuit is provided as one of the inputs to OR-circuit 23. The other or second input of this OR-circuit 23 is connected with the output of a start pulse generator 21 which, upon the arrival of a pulse sequence at its input, delivers a single pulse of a short duration. A switch 22 is connected between the start pulse generator 21 and the clock pulse generator 20.

A resetting or clearing key (not shown) is connected to actuate the two switches 22 and 240 and when these switches are closed the switch 240 will bridge the switch transistor 24, and, at the same time, the contact 22 will connect the clock pulse generator 20 to the start pulse generator 21. The output from stage 7 of the switching chain 100 is indirectly connected with the erasing input of flip-flop 26. The erasing inputs of the flip-flops 25 and 26 and the erasing line 54, which is connected with the flip-flops 29 through 33 of the storage register 50, are all connected with the output 19 of the flip-flop 130, and in this manner the output of stage 7 is connected with the erasing input of the flip-flop 26.

A comparison of the devices illustrated in FIGURES 1 and 2 indicates that the resetting or clearing devices are different in the two arrangements, although it is possible to provide both the transmitting and receiving sections of the device with the same resetting device, for example, the resetting device of FIGURE 1 may be used for both sections.

The circuit diagram of FIGURE 3 illustrates the invention proper wherein the sections illustrated in FIGURES 1 and 2 are combined into a common circuit diagram wherein similar elements bear identical reference numerals in FIGURES 1, 2, and 3. In order to adapt the device for use as a transmitter as well as a receiver, several switches are used which are partially operable together or ganged, and these switches provide for a regulated or controlled operation.

As indicated in FIGURE 3, selector or change-over switches 291, 301, 311, 321, and 331 are connected with the left inputs of the flip-flops 29 through 33 of storage register 50. Thus, by means of the selector switches the left inputs of these flip-flops may be connected either with the corresponding lines 101 through 105, or with the outputs of the AND-circuits 2 through 6. The outputs of the AND-circuits 2 through 6 are also connected with selector switches 44 through 48, respectively, and may be used to selectively connect the outputs of the AND-circuits with the selector switches 291 through 331 in order to connect the output of the AND-circuits with the left inputs of the flip-flops 29 through 33. These selector switches 44 through 48 may also be connected in the other positions thereof so that the outputs of the AND-circuits are connected with lines 112 through 116 which are the inputs to the first OR-circuit 55. Adjacent contacts of corresponding switches may be combined into a single contact, e.g., the line between switches 44 and 291 and the contacts at the ends thereof may actually be combined into a single contact.

The outputs from the flip-flops 29 through 33 are connected with selector switches 292, 302, 312, 322, and 332, respectively. By means of these switches, when in the transmitting position, connections are provided between the outputs of the flip-flops 29 through 33 and certain inputs of the AND-circuits 2 through 6. On the other hand, when the receiving function is to be arranged, connections are created between the outputs of flip-flops 29 through 33 and the output terminals 39 through 43 corresponding to *t*, *u*, *v*, *w*, and *x*, respectively.

The correct actuation of the switches may be provided by a known arrangement or operation which need not be described in detail here. For example, all of the necessary switches may be arranged and connected to three buttons which are entitled "resetting," "reception," and "transmission." As shown in FIGURE 3, with the exception of the switches 240 and 72, all of the switches are set for the reception or receiving condition.

The line 60 which is common to respective inputs of the AND-circuits 2 through 6, is connected with the input terminal for the series signal 37 by means of a selector switch 38 so that the line 60 can, by means of selector switch 38, be connected when desired to line 73 which is the common input to the flip-flops 7 through 12 of the switching chain 100.

The second OR-circuit 35 is provided with an output to which lines 120 and 61 are connected, the line 61 being connectable into the circuit by means of a selector switch 62 which may be used to connect, in one position, the output of the third OR-circuit 23 with the input stage of flip-flop 7 of the switching chain, and in the other position it connects the line 61 and thus the line 120 with the input of flip-flop 7. Another selector switch 36 is provided which can be connected with the line 120 so that it can selectively connect one of the inputs of the switching flip-flop 25 with the series signal input terminal 37 or with the output line 120 from the second OR-circuit 35.

A switch 79 is provided in line 13 so that the output line 13 from flip-flop 7 which is the first member of the switching chain 100, can be selectively connected or disconnected from the first AND-circuit 1. Also, as shown in FIGURE 3, a switch 28 is provided in the line which is connected from an output of the flip-flop 7 to one of the inputs to the flip-flop 26 for selective connection or disconnection.

The operation of the device will now be explained, and the transmitting section will first be explained with particular reference to FIGURES 1 and 4. The transmitter operates according to the start-stop principle. Each time a signal is fed to the transmitter, a cycle of operation through the switching chain 100 takes place. As the sequence of stages through the switching chain 100 are being activated, the switching chain interrogates the contents of register 50. The elements of the register are correlated with the elements of switching chain 100, and then the register 50 is cleared due to the action of switching chain 100, and the clearing takes place through switch 72, connection point 125, and line 54. The device will then remain in its rest condition until the next signal appears by means of one of the lines 00 through 09.

When the device is set into operation, a clearing key (not shown) is actuated which closes switch 240 and changes the position of selector switch 72. At this time, the clock pulse generator 20 begins operation and delivers shift pulses to point 91′ and thus to lines 73 and 60. These shift pulses clear the switching chain 100 and reset the storage register 50, by means of its line 54. Also, the flip-flop 25 is placed into the condition shown in FIGURE 1. When the clearing or reset key, mentioned above, is released, switch 240 is opened and switch 72 changes back to its original position. Then the clock pulse signal generator 20 ceases operation and the device is thus placed into readiness for the regular operation in a simple manner.

It is assumed now, for example, that a decimal digit 1 is fed by pressing a key on a calculating machine or on a typewriter. By this means there is a surge of negative voltage which arrives at the input 01 of coding device 34, and such a negative pulse is indicated in the first line of FIGURE 4. This negative voltage pulse is encoded by means of the coding device 34 into the binary digits LLL0L, as indicated in lines 106 through 110 of FIG. 4, which indicate the outputs of flip-flops 29 through 33 of storage register 50. This pulse combination indicating this code appears on the outputs of the coding device 34, and via lines 101 through 105 arranged in parallel, it arrives at the inputs of the flip-flops 29 through 33 of register 50. In this manner the flip-flops 29 through 33 are so set that the signals are stored as follows: 29 stores an L, 30 stores an L, 31 stores an L, 32 stores a 0, and 33 stores an L. The condition of these flip-flops can be seen from the left portion of rows *m* through *q* of FIGURE 4.

The pulse which corresponds to the decimal digit 1 and which appears on line 01 arrives at the OR-circuit 35 at the same time that the above is occurring and this can be seen from an inspection of FIGURE 1. This signal passes from the output line 120 of the OR-circuit 35 to connection point 121 and along line 122 to the left input *7a* of flip-flop 7 of the switching chain so that this flip-flop is thereby flipped into its operating condition. Simultaneously with this, the switch flip-flop 25 is flipped by the pulse and its output line 140, which leads to transistor 24, receives a negative potential and the transistor 24 thereby is placed into its conducting condition. In FIGURE 4, 140 indicates the negative pulse which appears on this line.

Figure 6:
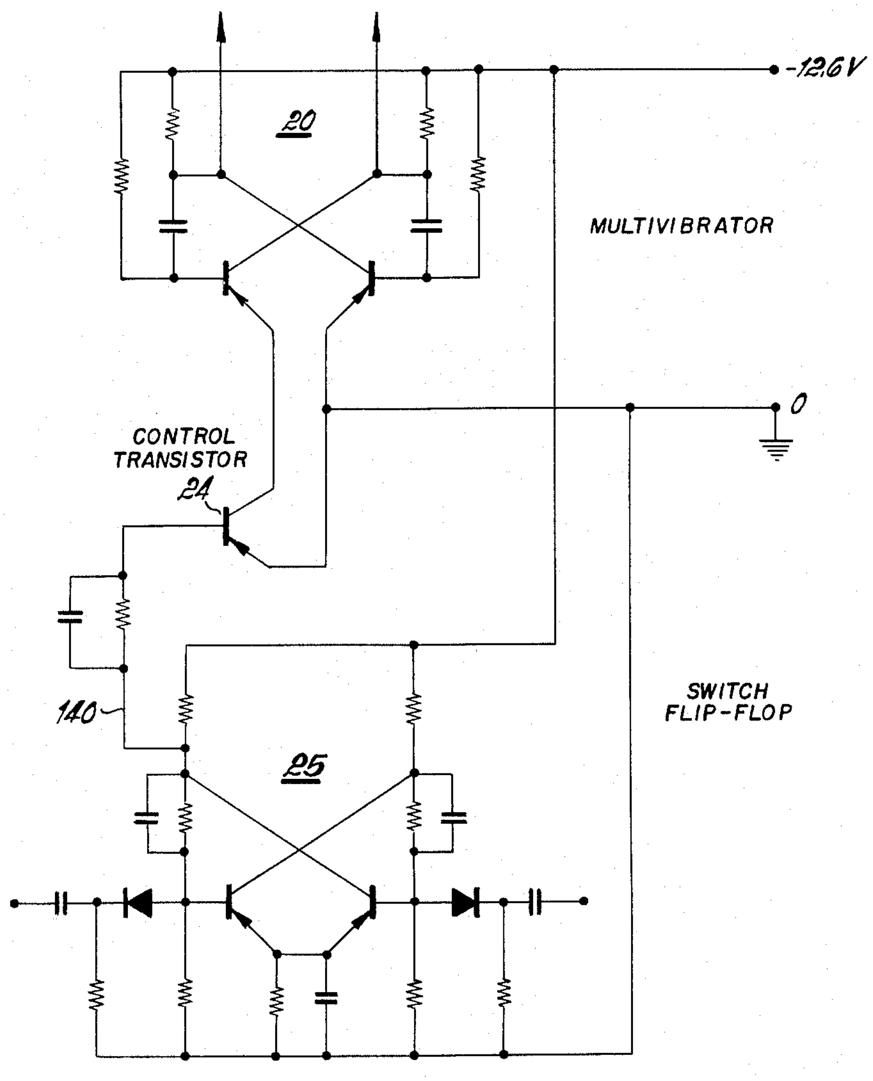
FIGURE 6 is a circuit diagram of the switching flip-flop, the switching transistor, and the multivibrator.

As shown in FIGURE 6, the emitter of the left transistor of the multivibrator 20 is placed at ground potential when transistor 24 conducts and the clock pulse generator 20 begins oscillation. When in the rest condition, connection point 91' was at a negative potential. The line 73 via the connecting line 111 and the common line 60 thus may be thought of as being combined with output line 13 of flip-flop 7 in the AND-circuit 1. This AND-circuit 1 delivers, along its output line 117, a first or synchronizing pulse to the OR-circuit 55 and this pulse ceases upon the onset of oscillations in the clock pulse generator 20.

The first negative flank of the shift pulse at point 91' deactivates the flip-flop 7 and the flip-flop 8 is activated so that at this time a signal is provided at its output 14. The subsequent pulses appearing at point 91' or on the line 73 shift the operating condition of the switching chain through all of the sequential flip-flops 8 through 12 and by this means the contents of the storage register is, in a step by step manner, completely interrogated and is delivered to the OR-circuit 55 through the lines 112 through 116 and then a signal in correspondence thereto appears at the output line 150 as shown in FIGURE 4.

Figure 4:
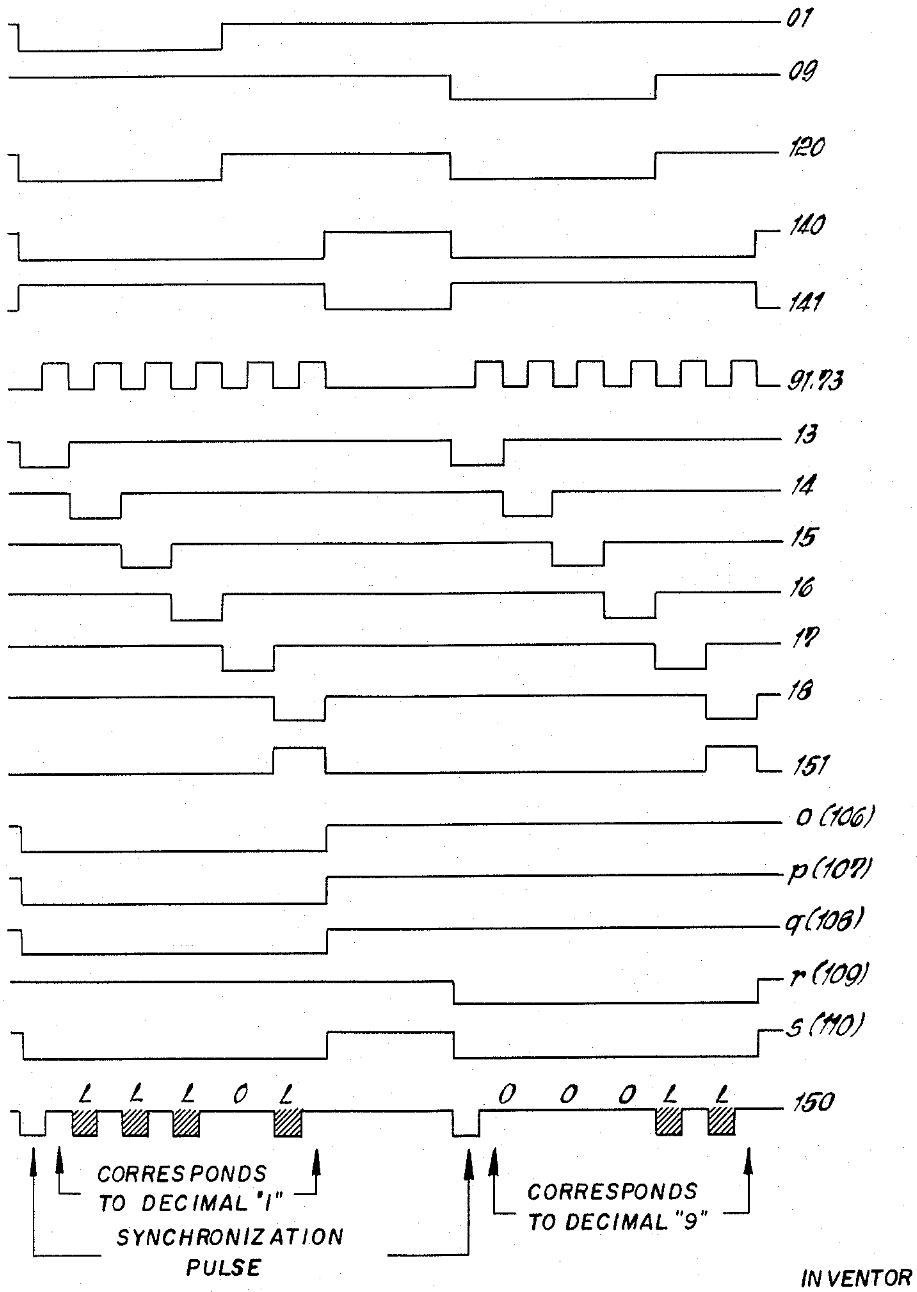
FIGURE 4 is a diagram indicating the timing of pulses at various places in the parallel-series section of the circuit during transmission.

When the flip-flop 12 is switched or flipped back, a negative voltage pulse is produced on line 151 as shown in FIGURE 4 and this clears register 50 through the switch 72 and connection point 125, and, through line 125' and the switch flip-flop 25 and line 140, shuts off the clock pulse generator 20. Thus, a single cycle through the device is terminated and the initial condition mentioned above is reestablished.

At this point a following digit, for example, a decimal 9, can be fed in the manner discussed above with respect to decimal 1. The frequency of the clock pulse generator 20 should be chosen to be such that the interrogation of the storage register 50 is completed before feeding of the next digit occurs.

Figure 5:
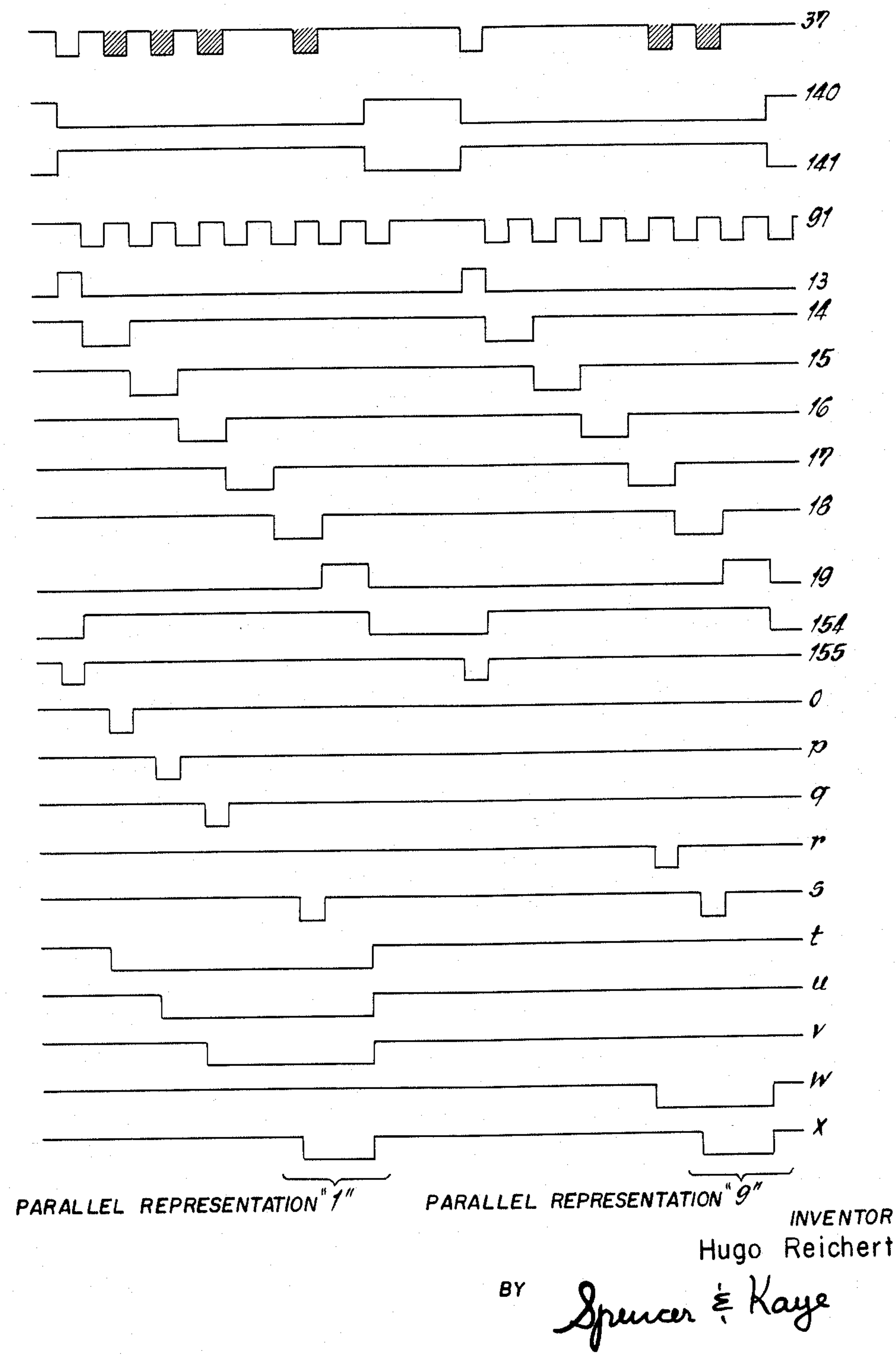
FIGURE 5 is a diagram indicating the timing of pulses in the series-parallel section of the circuit during reception.

The operation of the receiver section of this device will now be described in particular, and with special reference to FIGURES 2 and 5. Firstly, the clearing key is activated after the receiver is first switched on and the contacts 22 and 240 are thereby closed. The start pulse generator 21 delivers a single negative pulse which activates flip-flop 7 through the OR-circuit 23 and this is indicated in row 13 of FIGURE 5 wherein an output signal is indicated as being provided on the output line 13 of flip-flop 7. This pulse must be stored in the switching chain in order to assure that in any case at least one pulse is delivered from the switching chain 100 to clear the elements which are connected thereto.

The shift pulses which appear in line 91 provide for passage of the pulse which is stored in flip-flop 7 through the switching chain 100. Clearing could also be carried out in the same manner as is performed in the transmitter section described above and in this event an advantage is provided in that the same components may be used for the transmitter and receiver in almost all cases, and in the above-described clearing operation only an alternative method of clearing is indicated. It should, therefore, be noted that the clearing operation may be performed with the same components for both the transmitter and receiver in almost all cases. After the clearing operation the device is ready for reception of signals.

The first signal which arrives at terminal 37 causes the flip-flop 25 to flip into its operating condition and thus the clock pulse generator 20 is actuated through line 140, the switch transistor 24, and line 141. At the same time, the first pulse passes through the AND-circuit 27 to the line 155, it being noted that the AND-circuit 27 has been prepared or opened for operation because of the flip-flop 26 and line 154, which is an input to this AND-circuit, on which a signal appears at this time due to the first pulse. At this time the AND-circuits 2 through 6 are blocked because of the absence of signals on the outputs of flip-flops 8 through 12 and 130 of the switching chain and therefore the first synchronizing pulse does not appear in the storage register 50. The first negative flank of the shift pulses on line 91 deactivates the flip-flop 7 and in this manner provides for the storage of a pulse in the flip-flop 8. Simultaneously, flip-flop 26 changes condition and the input to the switching chain 100 is disconnected at the AND-gate 27 from the information input 37 and no further signals can then arrive at the switching chain 100.

As the switching chain becomes sequentially activated the information LLL0L is delivered to register 50 due to the coincidence of pulses at input terminal 37, and thus on line 60, and in the lines 14 through 18. This information then becomes available at terminals *t* to *x* for a short time and in parallel form, and the time for which it is available depends upon the mode of operation of the devices which are connected thereto. The timing of arrival and decay of these pulses is indicated in FIGURE 5. If a device of the type which requires a great deal of power, such as a tape punching device, is connected with terminals *t* through *x*, then the contents of the storage register 50 should be aided to provide stronger signals for actuating the device as necessary.

When the last flip-flop 130 is switched, register 50 is thereby cleared and the clock pulse generator 20 is shut off due to the signal on the output line 19 of flip-flop 130. In addition, the flip-flop 26, which is connected with an input to the AND-circuit 27, again closes the path for the synchronizing signal associated with the next bit of information, for example, as shown in FIGURE 5, a decimal 9.

The above described operations take place in the device of FIGURE 3 in the same manner as described in detail with reference to FIGURES 1 and 2, and for this purpose all of the switches 28, 36, 38, 62, 79, 44, 45, 46, 47, 48, 291, 301, 311, 321, 331, 292, 302, 312, 322, and 332, should be in such position that the circuit of FIGURE 3 will, due to its circuit connections, correspond either to the transmitter of FIGURE 1 or to the receiver of FIGURE 2. Initiating the switching processes to convert from one device to the other need not be described in detail since a person skilled in the art can connect these switches so that they operate in a proper manner by simply pressing down a proper key. FIGURE 3 illustrates the arangement connected as a receiver or series-parallel converter.

All of the above mentioned switches can be constructed as contacts or selector switches of a relay. However, these switches may also be considered as a contact of a key actuated switch. According to the present invention, however, the object is to carry out the change-over of these last mentioned switches in a single working step.

FIGURE 7 illustrates the start pulse generator 21 wherein terminal 160 is connected through a diode 162 to a capacitor 164. A connection point 163 is provided between the capacitor and the diode and a capacitor 168 is connected at this point. If a pulse arrives at terminal 160, as indicated in the pulse diagram of FIGURE *7a*, capacitor 168 is suddenly charged to render point 163 positive and this positive voltage surge is differentiated at point 165 and appears at the base of transistor 166. Then, a single negative pulse will appear at the output terminal 167.

It should thus be noted that with the use of the present invention the various stages of a switching chain are connected with the output of a clock pulse generator and the output of the switching chain is connected to a set of AND-circuits. The outputs of these AND-circuits may be selectively connected by means of selector switches to a common first OR-circuit or by means of another set of selector switches to stages of a storage register, each AND-circuit being connected with a respective stage of the register which pertains thereto. The register is provided for short term storage of coded communications appearing in parallel representation. The respective first inputs of these AND-circuits are connected by means of a common collecting line to a selector switch which may connect a common line with an input terminal for series pulses or with the clock pulse generator. The present invention provides for rapid and simple conversion of the device from one for receiving to one for transmitting and vice versa by using switches. The device is arranged so that upon the appearance of a single releasing or trigger signal, the device is operable as a parallel-series converter, or, using the same circuit components, series-parallel converter.

By means of the arrangement of the present invention which is disclosed in detail above, it is possible to use almost identical component arrangements in the transmitter and in the receiver and thus the transmitter and receiver becomes a single unit in which the following parts are common to the transmitter and receiver: the switching chain, the storage register, the set of AND-circuits arranged between each stage of the switching chain and each register stage respectively, and the actuating mechanism for transmitting and receiving, as well as the potential for providing a cancelling operation for the transmitter and receiver with the same components.

Furthermore, in one arrangement of the present invention the input for the first stage of the switching chain may be connected by means of a selector switch and a conducting line to a second OR-circuit for decimal inputs or to a third OR-circuit for transmitting a start pulse.

In order to set the device into operation, a switch flip-flop is arranged having one of its inputs connected with a selector switch so that it may be selectively connected with the output of the second OR-circuit, indicating a decimal digit has been fed into the coding device, or to the input terminal for the series signals. The second input thereof is connected to the output of the final stage of the switching chain and the output of this switching flip-flop is connected to a switching transistor which controls the clock pulse generator of the device. Since the decimal inputs are together connected to a second OR-circuit, this renders it possible to feed a number, such as the decimal number 4, in binary coded form to the stages of the storage register, and to actuate the switching chain by the feeding process. The chain is responsive to the output of the above mentioned second OR-circuit, and the feeding process is initiated by actuating the key of a calculating machine, for example. After actuation of the switching chain, it interrogates the storage register stages sequentially step by step and delivers the values stored therein in the form of a series of pulses or a pulse sequence or train to the output terminal of the device.

It should be noted that with the present device the expense as far as circuit components are concerned may be very small. Furthermore, a proper sequence reception is assured because the receiving station is provided with its own clock pulse generator and inversion of the clock pulse is not necessary. Similarly, continuous synchronization of the clock pulse generators in the transmitting and in the receiving stations does not have to be provided and separate transmission of the pulses can be omitted.

It should be realized that the particular advantages are provided since the transmitter and receiver are arranged with almost identical circuit elements, and, by actuating only a single key, switches may be actuated which provides a series-parallel from a parallel-series converter and which may receive coded signals as information input, transmit them to the above mentioned AND-circuits, and simultaneously actuate, upon the first signal, a switch flip-flop which in turn actuates a switch transistor and thus the clock pulse generator. The arrangement of the elements is such, with respect to each other, that the bits of information which are fed in series to the AND-circuits are transferred into the storage register in parallel form by means of the switching chain.

It will be understood that the above description of the present invention is susceptible to various modifications, changes, and adaptations, and the same are intended to be comprehended within the meaning and range of equivalents of the appended claims.

It will be further understood, that all the necessary switches in the circuits can be electronic as well as mechanical.

What is claimed is:

1. A long distance transmission device for digital signals, comprising, in combination:

(a) a clock pulse generator;

(b) a set of AND-circuits having respective first inputs, and having respective second inputs connected together;

(c) switching chain means including a plurality of chain members, said chain means having an input connected with the output of said clock pulse generator, and said chain members having outputs connected with said respective first inputs of said AND-circuits;

(d) a storage register having stages for temporary storage of bits of coded information in parallel representation;

(e) an OR-circuit;

(f) first switch means for selectively connecting the outputs of said set of AND-circuits (1) as inputs to said OR-circuit and (2) with respective stages of said storage register; and (g) second switch means for selectively connecting said respective second inputs with (1) an input terminal for receiving bits of coded information in series and (2) with the output of the clock pulse generator.

2. A long distance transmission device for digital signals comprising, in combination:

(a) a clock pulse generator;

(b) a set of AND-circuits having respective first inputs connected together;

(c) switching chain means including a plurality of chain members, said chain means having inputs connected with the output of said clock pulse generator for operating said chain means, and said chain members having outputs connected with respective second inputs of said AND-circuits for sequentially providing a respective signal thereto;

(d) a storage register having stages for temporarily storing coded intelligence in parallel representation and having an information input section connectable with the input to said clock pulse generator for parallel-series conversion;

(e) an OR-circuit for providing an output for parallel-series conversion;

(f) a series input section connectable with the input to said clock pulse generator; and (g) means for selectively changing said device from a parallel-series converter into a series-parallel converter, and vice versa, said means including switches for selectively connecting:

(1) the respective outputs of said set of AND-circuits;

(i) as inputs to said OR-circuit for parallel-series conversion, and (ii) with respective stages of said storage register for series-parallel conversion;

(2) said respective first inputs with (i) the output of the clock pulse generator for parallel-series conversion, and (ii) the series input section for receiving coded intelligence in series for series-parallel conversion ;and (3) the outputs of said storage register stages with corresponding respective third inputs of said AND-circuits for parallel-series conversion, whereby the device will, upon the appearance of only one trigger signal at the input section, operate either as a parallel-series converter or a series-parallel converter, depending upon how said switches are set.

3. A device as defined in claim 2 comprising resetting means connected to a line common to all respective second inputs of said register stages for normally connecting them to the output of said switching chain means and, when said resetting means are actuated, for connecting them with the output of said clock pulse generator.

4. A device as defined in claim 2 wherein said selectively changing means includes selector switches.

5. A device as defined in claim 2 comprising a set of parallel representation output terminals providing a series-parallel conversion output, said selectively changing means being arranged to connect the output of said register stages with respective output terminals for series-parallel conversion.

6. A device as defined in claim 2 comprising a coding device for coding decimal numbers in binary form; and wherein said selectively changing means includes (a) first respective selector switches for connecting the respective outputs of said set of AND-circuits, (1) with respective first contacts as inputs to said OR-circuit for parallel-series conversion, and (2) with respective second contacts for series-parallel conversion; and (b) second respective selector switches for connecting the respective outputs of said coding device, (1) with respective first contacts as inputs to respective register stages for parallel-series conversion, and (2) with respective second contacts for series-parallel conversion, said second contacts being correspondingly connected to each other.

7. A device as defined in claim 2 comprising output terminals; and wherein said selectively changing means includes respective selector switches for connecting the outputs of said register stages (1) with the corresponding respective third inputs of said AND-circuits for parallel-series conversion, and (2) with the corresponding respective output terminals for providing the parallel output for series-parallel conversion.

8. A long distance transmission device as defined in claim 2 comprising (a) a second OR-circuit having inputs corresponding to decimal input information; and (b) a third OR-circuit for transmitting a start pulse, and said selectively changing means being arranged for selectively connecting the input of the first member of said switching chain (1) with the output of said second OR-circuit for providing an indication of decimal input thereto for parallel-series conversion, and (2) with the output of said third OR-circuit for providing a start pulse thereto for series-parallel conversion.

9. A device as defined in claim 8 comprising a start pulse generator between said clock pulse generator and said third OR-circuit.

10. A device as defined in claim 9 wherein said selectively changing means is arranged to connect the clock pulse generator with the third OR-circuit for series-parallel conversion, and for disconnecting them for parallel-series conversion.

11. A long distance transmission device as defined in claim 8 comprising (a) switch transistor means for controlling said clock pulse generator; and (b) a switch flip-flop having a first input connected to the output of said switching chain and an output connected to said switch transistor means, and said selectively changing means being arranged for selectively connecting a second switch flip-flop input (1) with the input terminal for series-parallel conversion, and (2) with the output of said second OR-circuit for parallel-series conversion.

12. A device as defined in claim 11 wherein said selectively changing means are arranged for connecting said switch transistor means, said switch flip-flop, and said clock pulse generator for switching the device on and off both for parallel-series and for series-parallel conversion.

13. A device as defined in claim 11 comprising a coding device having decimal input information corresponding to the decimal input information of said second OR-circuit for coding the decimal information into coded digital form.

14. A device as defined in claim 13 wherein said selectively changing means is arranged for connecting the outputs of said coding device to respective inputs of the stages of the storage register for parallel-series conversion, and for disconnecting said coding device outputs from the respective register inputs for series-parallel conversion.

15. A device as defined in claim 14 wherein said selectively changing means includes selector switches and the respective switch contacts of the switches for disconnecting the outputs of said coding device from the respective stages of the storage register form a part of the switches for connecting the respective outputs of said set of AND-circuits with respective stages of said storage register.

16. A device as defined in claim 14 comprising resetting means for connecting the circuit to reset the stages of said register and normally connecting the other respective inputs of said register stages with the output of said switching chain means.

17. A device as defined in claim 16 wherein said resetting means is arranged for disconnecting said other respective register stage inputs from said switching chain means output and for connecting said other stage inputs with the output of said clock pulse generator, when said resetting means are actuated, for clearing said register.

18. A long distance transmission device for digital signals comprising, in combination:

(a) a clock pulse generator;

(b) a set of AND-circuits having respective first inputs connected together;

(c) switching chain means including a plurality of chain members, said chain means having inputs connected with the output of said clock pulse generator for operating said chain means, and said chain members having outputs connected with respective second inputs of said AND-circuits for sequentially providing an output signal thereto;

(d) a storage register having stages for temporarily storing coded intelligence in parallel representation and having a parallel information input for connection with the input to said clock pulse generator for parallel-series conversion;

(e) an OR-circuit providing an output for parallel-series conversion; and (f) means for selectively changing said device from a parallel-series converter into a series-parallel converter, and vice versa, said means including switches for selectively connecting:

(1) the outputs of said set of AND-circuits
  (i) as inputs to said OR-circuits for parallel-series conversion or
  (ii) with respective stages of said storage register when a receiver;
(2) said respective first inputs with
  (i) the output of the clock pulse generator for parallel-series conversion,
  (ii) a series input terminal for receiving coded intelligence in series for series-parallel conversion, and with the input to said clock pulse generator; and
(3) the outputs of said storage register stages with corresponding respective third inputs of said AND-circuits for parallel-series conversion.

No references cited.

NEIL C. READ, *Primary Examiner.*

THOMAS B. HABECKER, *Examiner.*